US012654843B2

(12) United States Patent
Morton et al.

(10) Patent No.: US 12,654,843 B2
(45) Date of Patent: Jun. 16, 2026

(54) MULTIPIECE NOSE CONE FOR OPEN ROTOR PROPULSION SYSTEM

(71) Applicant: RTX Corporation, Farmington, CT (US)

(72) Inventors: Jeffrey T. Morton, Manchester, CT (US); Edward J. Gallagher, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/971,205

(22) Filed: Dec. 6, 2024

(65) Prior Publication Data

US 2026/0159224 A1     Jun. 11, 2026

(51) Int. Cl.
*B64C 11/14*     (2006.01)
*F02C 7/04*     (2006.01)

(52) U.S. Cl.
CPC ............... *B64C 11/14* (2013.01); *F02C 7/04* (2013.01); *F05D 2220/323* (2013.01); *F05D 2250/232* (2013.01)

(58) Field of Classification Search
CPC ...... B64C 11/14; F02C 7/04; F05D 2220/323; F05D 2250/232
See application file for complete search history.

(56) References Cited

U.S. PATENT DOCUMENTS

| | | | |
|---|---|---|---|
| 1,927,921 A | | 9/1933 | Courtney |
| 2,804,154 A | * | 8/1957 | Treseder ............... B64D 35/04 |
| | | | 416/49 |

| | | | |
|---|---|---|---|
| 2,924,282 A | * | 2/1960 | Perryman ............... B64C 11/14 |
| | | | 416/245 R |
| 4,722,666 A | * | 2/1988 | Dennison ................. F02C 7/14 |
| | | | 416/174 |
| 5,224,833 A | * | 7/1993 | Nicholas ................ B64C 11/14 |
| | | | 415/218.1 |

(Continued)

FOREIGN PATENT DOCUMENTS

| | | | | |
|---|---|---|---|---|
| EP | 1445193 A1 | * | 8/2004 | ............. B64D 35/04 |
| EP | 2955361 A1 | * | 12/2015 | ............... F02C 7/04 |

(Continued)

OTHER PUBLICATIONS

EP search report for EP25221565.2 dated Apr. 20, 2026.

*Primary Examiner* — Courtney D Heinle
*Assistant Examiner* — Ryan C Clark
(74) *Attorney, Agent, or Firm* — Getz Balich LLC

(57)     ABSTRACT

A propulsion system assembly includes an open propulsor rotor, an open guide vane structure and a nose cone. The open propulsor rotor is configured to rotate about an axis. The open guide vane structure is aft of the open propulsor rotor along the axis. The nose cone is forward of the open propulsor rotor along the axis. The nose cone includes a forward tip end, an aft base end, a stationary section and a rotating section. The aft base end is adjacent to the open propulsor rotor. The stationary section projects axially along the axis from a junction between the stationary section and the rotating section to the forward tip end. The rotating section projects axially along the axis from the junction between the stationary section and the rotating section to the aft base end. The rotating section is configured to rotate with the open propulsor rotor about the axis.

20 Claims, 15 Drawing Sheets

(56) References Cited

U.S. PATENT DOCUMENTS

| | | | | |
|---|---|---|---|---|
| 5,833,435 A * | 11/1998 | Smith | ..................... | F02C 7/04 |
| | | | | 29/889.1 |
| 7,559,191 B2 * | 7/2009 | Parks | ..................... | B64C 11/14 |
| | | | | 416/94 |
| 9,115,593 B2 * | 8/2015 | Suciu | ..................... | F01D 13/02 |
| 9,920,708 B2 * | 3/2018 | Suciu | ..................... | F01D 25/125 |
| 10,006,302 B2 * | 6/2018 | Suciu | ..................... | F01D 5/02 |
| 10,823,058 B2 * | 11/2020 | Roach | ..................... | B64C 11/14 |
| 11,098,646 B2 * | 8/2021 | Macchia | ..................... | F02C 7/047 |
| 2009/0060748 A1 * | 3/2009 | Landa | ..................... | F03D 80/60 |
| | | | | 416/93 R |
| 2013/0259687 A1 * | 10/2013 | Suciu | ..................... | F02C 7/04 |
| | | | | 416/1 |
| 2014/0017067 A1 * | 1/2014 | Stretton | ..................... | F02C 3/067 |
| | | | | 415/208.1 |
| 2016/0298540 A1 * | 10/2016 | Suciu | ..................... | F02C 7/14 |
| 2016/0326906 A1 * | 11/2016 | Sheridan | ..................... | F02C 7/36 |
| 2016/0333734 A1 | 11/2016 | Bowden | | |
| 2017/0122207 A1 * | 5/2017 | Suciu | ..................... | B64C 11/14 |
| 2017/0362999 A1 | 12/2017 | Abe | | |
| 2020/0010172 A1 | 1/2020 | Harner | | |
| 2020/0055586 A1 * | 2/2020 | Foskey | ..................... | B64C 11/14 |
| 2024/0352867 A1 | 10/2024 | Goyette | | |

FOREIGN PATENT DOCUMENTS

| | | | | | |
|---|---|---|---|---|---|
| EP | 3093437 A1 * | 11/2016 | ............. | B64D 33/02 |
| EP | 3590828 A1 * | 1/2020 | ........... | F04D 29/522 |
| EP | 4394168 A1 * | 7/2024 | ............... | F02C 7/36 |
| EP | 4467448 A1 | 11/2024 | | |
| GB | 1357112 A * | 6/1974 | ............... | F02C 7/14 |
| WO | WO-0220349 A1 * | 3/2002 | ............. | B64C 11/14 |
| WO | WO-2020249888 A1 * | 12/2020 | ........... | B64C 11/14 |
| WO | WO-2022200733 A1 * | 9/2022 | ............. | F01D 25/02 |
| WO | WO-2024022304 A1 * | 2/2024 | ............. | F02C 7/047 |

* cited by examiner

Air System
148

MULTIPIECE NOSE CONE FOR OPEN ROTOR PROPULSION SYSTEM

BACKGROUND OF THE DISCLOSURE

1. Technical Field

This disclosure relates generally to an open rotor propulsion system and, more particularly, to a nose cone for the open rotor propulsion system.

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, an assembly is provided for an aircraft propulsion system. This assembly includes an open propulsor rotor, an open guide vane structure and a nose cone. The open propulsor rotor is configured to rotate about an axis. The open guide vane structure is aft of the open propulsor rotor along the axis. The nose cone is forward of the open propulsor rotor along the axis. The nose cone includes a forward tip end, an aft base end, a stationary section and a rotating section. The aft base end is adjacent to the open propulsor rotor. The stationary section projects axially along the axis from a junction between the stationary section and the rotating section to the forward tip end. The rotating section projects axially along the axis from the junction between the stationary section and the rotating section to the aft base end. The rotating section is configured to rotate with the open propulsor rotor about the axis.

According to another aspect of the present disclosure, another assembly is provided for an aircraft propulsion system. This assembly includes an open propulsor rotor and a nose cone. The open propulsor rotor is configured to rotate about an axis. The nose cone is upstream of the open propulsor rotor. The nose cone includes a forward tip end, an aft base end, a stationary section, a rotating section and an air scoop. The aft base end borders the open propulsor rotor. The stationary section projects axially along the axis from a junction between the stationary section and the rotating section to the forward tip end. The rotating section projects axially along the axis from the junction between the stationary section and the rotating section to the aft base end. The rotating section is configured to rotate with the open propulsor rotor about the axis. The air scoop is located at the junction between the stationary section and the rotating section.

According to still another aspect of the present disclosure, another assembly is provided for an aircraft propulsion system. This assembly includes an open propulsor rotor and a nose cone. The open propulsor rotor is configured to rotate about an axis. The nose cone is upstream of the open propulsor rotor. The nose cone includes a forward tip end, an aft base end, a stationary section and a rotating section. The aft base end borders the open propulsor rotor. The stationary section projects axially along the axis from a junction between the stationary section and the rotating section to the forward tip end. The rotating section projects axially along the axis from the junction between the stationary section and the rotating section to the aft base end. The rotating section is configured to rotate with the open propulsor rotor about the axis. A sidewall of the stationary section axially overlaps a sidewall of the rotating section at the junction between the stationary section and the rotating section.

The sidewall of the stationary section may be radially outboard of the sidewall of the rotating section at the junction between the stationary section and the rotating section.

The sidewall of the rotating section may be radially outboard of the sidewall of the stationary section at the junction between the stationary section and the rotating section.

The nose cone may have an axial length extending between the forward tip end and the aft base end. An axial distance from the forward tip end to the junction between the stationary section and the rotating section may be between fifty percent and eighty percent of the axial length.

The assembly may also include an air system configured to receive air from outside of the aircraft propulsion system through the air scoop.

The nose cone may have an axial length extending between the forward tip end and the aft base end. An axial distance from the forward tip end to the junction between the stationary section and the rotating section may be equal to or greater than fifty percent of the axial length.

The nose cone may have an axial length extending between the forward tip end and the aft base end. An axial distance from the forward tip end to the junction between the stationary section and the rotating section may be equal to or less than eighty percent of the axial length.

The nose cone may have an axial length extending between the forward tip end and the aft base end. An axial distance from the forward tip end to the junction between the stationary section and the rotating section may be between fifty percent and sixty-five percent of the axial length.

The nose cone may have an axial length extending between the forward tip end and the aft base end. An axial distance from the forward tip end to the junction between the stationary section and the rotating section may be between sixty-five percent and eighty percent of the axial length.

A sidewall of the stationary section may be flush with a sidewall of the rotating section at the junction between the stationary section and the rotating section.

A sidewall of the stationary section may be stepped from a sidewall of the rotating section at the junction between the stationary section and the rotating section.

A sidewall of the rotating section may be radially outboard of and may axially overlap a sidewall of the stationary section at the junction between the stationary section and the rotating section.

A sidewall of the stationary section may be radially outboard of a sidewall of the rotating section at the junction between the stationary section and the rotating section.

An overlap between a sidewall of the stationary section and a sidewall of the rotating section at the junction between the stationary section and the rotating section may be symmetrical about the axis.

An overlap between a sidewall of the stationary section and a sidewall of the rotating section at the junction between the stationary section and the rotating section may be asymmetrical about the axis.

The nose cone may also include an air scoop disposed at the junction between the stationary section and the rotating section. The air scoop may be configured to direct air into an internal volume of the nose cone.

The air scoop may be formed by the stationary section and the rotating section.

The assembly may also include an air passage internal to the aircraft propulsion system. The stationary section and the rotating section may form an air scoop at the junction between the stationary section and the rotating section. The air scoop may be configured to fluidly couple an environment external to the nose cone with the air passage.

The nose cone may also include an air scoop disposed at the junction between the stationary section and the rotating section. The assembly may also include an air system fluidly coupled to the air scoop. The air system may be configured to use air received from the air scoop to cool one or more internal components of the aircraft propulsion system.

The nose cone may also include an air scoop disposed at the junction between the stationary section and the rotating section. The assembly may also include an air system fluidly coupled to the air scoop. The air system may be configured to use air received from the air scoop to vent one or more internal volumes within the aircraft propulsion system.

The open propulsor rotor may include a platform and a plurality of open propulsor blades projecting radially out from the platform. The rotating section may be discrete from the platform.

The rotating section may be mechanically fastened to the open propulsor rotor.

The assembly may also include a turbine engine configured to drive rotation of the open propulsor rotor and the rotating section about the axis.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
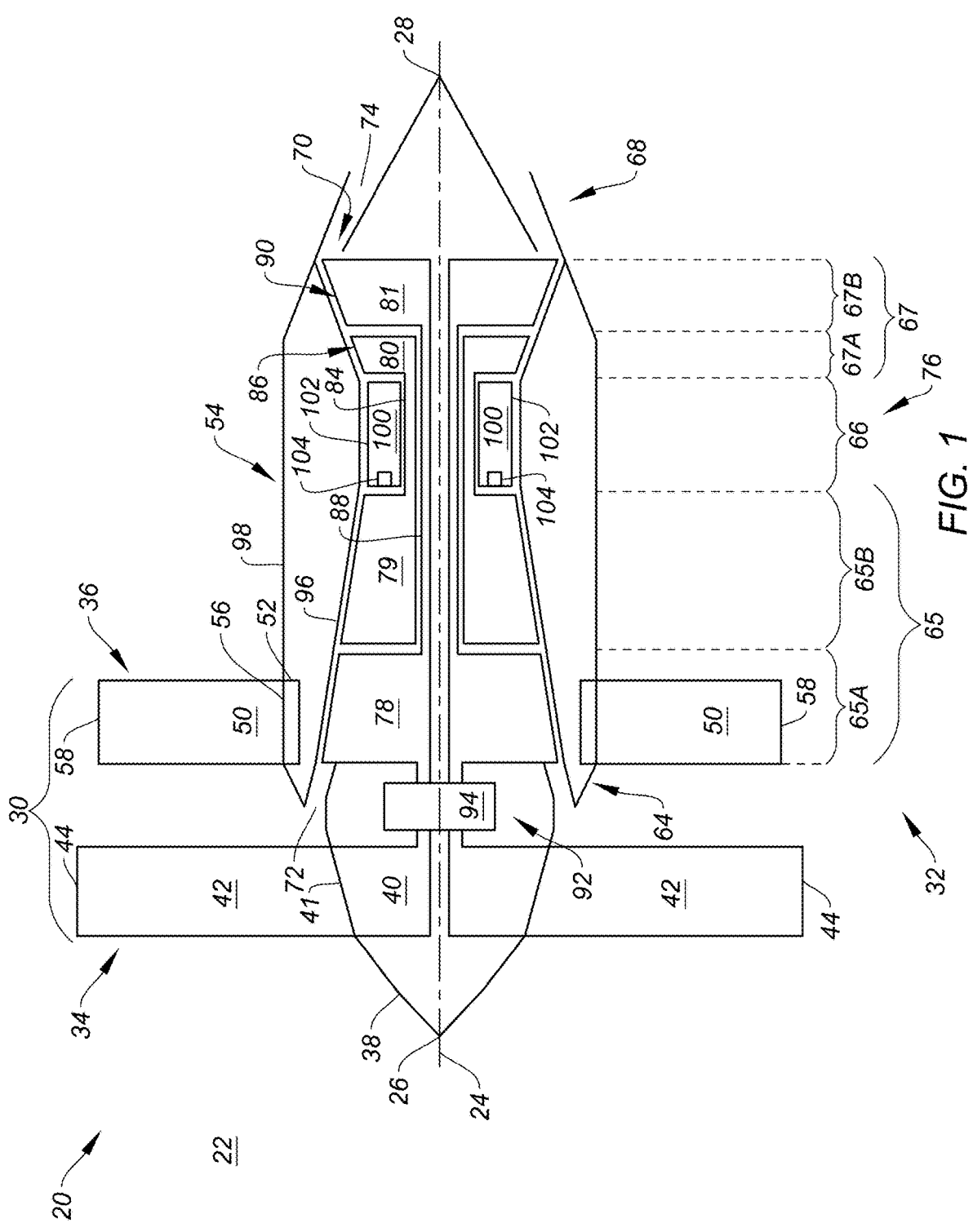
FIG. 1 is a schematic sectional illustration of an aircraft propulsion system.

FIG. 1 is a schematic illustration of a propulsion system 20 for an aircraft. The aircraft may be an airplane, a drone (e.g., an unmanned aerial vehicle (UAV)), or any other manned or unmanned aerial vehicle or system. The aircraft propulsion system 20 may be configured as an open rotor propulsion system with a single open rotor and swirl recovery vane (SRV) architecture. Herein, the term "open" may describe a propulsion system section and/or a propulsion system component which is open to an environment 22 (e.g., an ambient environment) external to the aircraft propulsion system 20 and, more generally, the aircraft.

The aircraft propulsion system 20 extends axially along an axis 24 between an upstream, forward end 26 of the aircraft propulsion system 20 and a downstream, aft end 28 of the aircraft propulsion system 20. The propulsion system axis 24 may be a centerline axis of the aircraft propulsion system 20 and/or a centerline axis of one or more members of the aircraft propulsion system 20. The propulsion system axis 24 may also or alternatively be a rotational axis of one or more members of the aircraft propulsion system 20. The aircraft propulsion system 20 of FIG. 1 includes an open rotor propulsion section 30 and a gas turbine engine 32.

The propulsion section 30 of FIG. 1 includes an open propulsor rotor 34 and an open guide vane structure 36. These propulsion section members 34 and 36 are illustrated as un-ducted and unshrouded components of the aircraft propulsion system 20 and its propulsion section 30. However, in alternate embodiments, the open guide vane structure 36 may include a shroud configured at a distal tip 58. In such embodiments, at least or only the open guide vane structure 36 would include an un-ducted, shrouded component of the propulsion system 30. The propulsion section 30 of FIG. 1 also includes a nose cone 38 disposed at (e.g., on, adjacent or proximate) the propulsion system forward end 26.

The propulsor rotor 34 includes a rotor base 40 (e.g., a disk or a hub), an inner platform 41 and a plurality of open propulsor blades 42 (e.g., airfoils). The propulsor blades 42 are arranged and may be equispaced circumferentially about the rotor base 40 and the propulsion system axis 24 in an array; e.g., a circular array. Each of the propulsor blades 42 is connected to (e.g., formed integral with or otherwise attached to) the rotor base 40. Each of the propulsor blades 42 projects spanwise along a span line of the respective propulsor blade 42 (e.g., radially relative to the propulsion system axis 24) out from an exterior surface of the inner platform 41, into the external environment 22, to an unshrouded distal tip 44 of the respective propulsor blade 42. Each propulsor blade 42 is thereby configured as an un-ducted and unshrouded propulsor blade which is exposed to (e.g., disposed in) the surrounding external environment 22. Briefly, the inner platform 41 may be configured as a tubular body with apertures through which the propulsor blades 42 (or mounting couplings for the propulsor blades 42) respectively project radially through. Alternatively, the inner platform 41 may be configured from a plurality of platform sections arranged circumferentially about the propulsion system axis 24. Each of the platform sections may be configured as a fairing member which is discrete from the propulsor blades 42 and mechanically attached or otherwise connected to the rotor base 40. Still alternatively, each of the platform sections may be configured integral with a respective one of the propulsor blades 42. The present disclosure, however, is not limited to such exemplary inner platform configurations.

Figure 2:
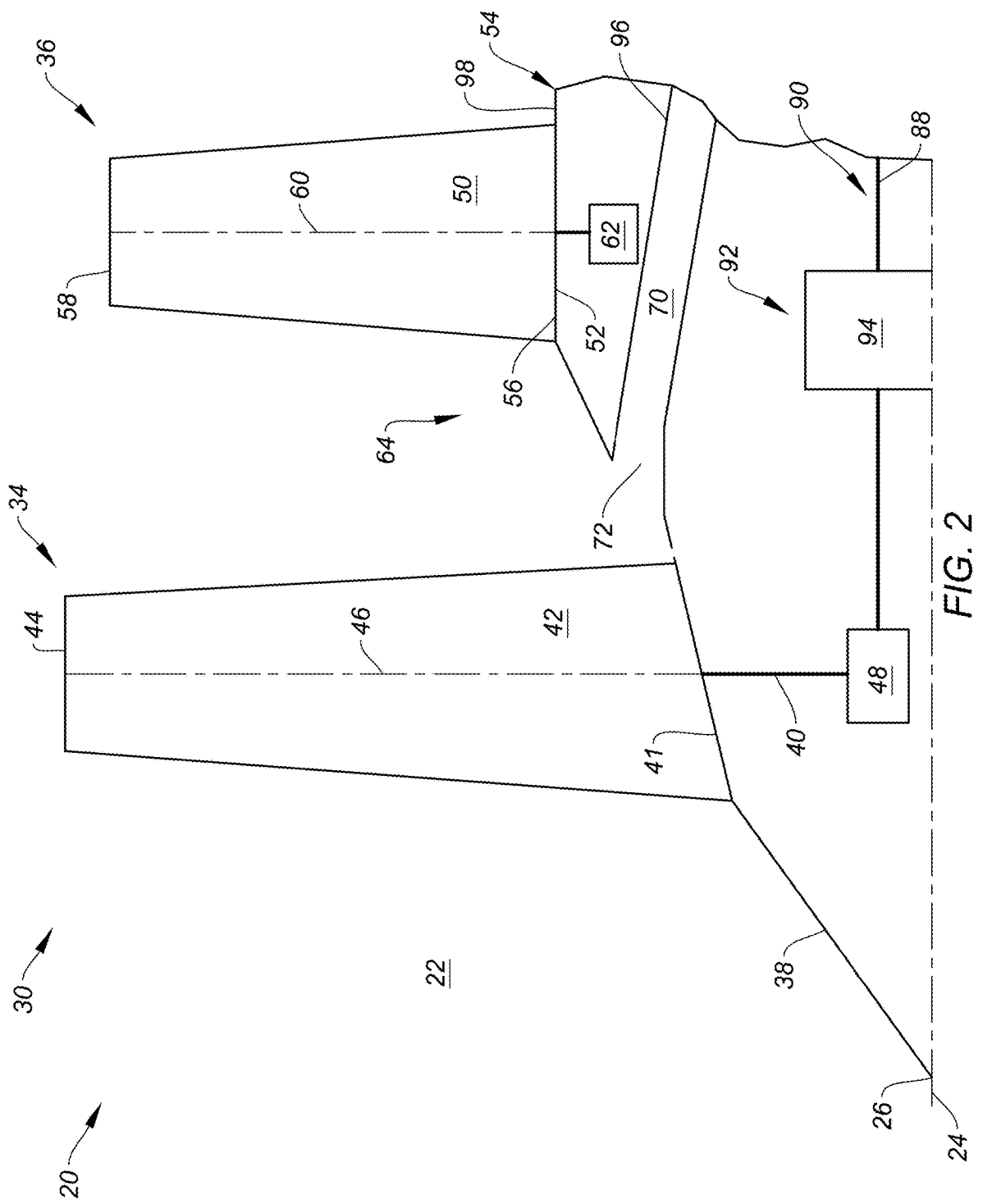
FIG. 2 is a partial schematic sectional illustration of the aircraft propulsion system at a propulsion section.

Referring to FIG. 2, each propulsor blade 42 may be configured to pivot about a respective blade pivot axis 46. This blade pivot axis 46 extends radially relative to the propulsion system axis 24. The blade pivot axis 46 of FIG.

2, for example, is arranged perpendicular to the propulsion system axis 24 when viewed, for example, in a longitudinal reference plane parallel to (e.g., including) the propulsion system axis 24; e.g., the plane of FIG. 2. Each propulsor blade 42 of FIG. 2 is operatively coupled with a blade actuation system 48. This blade actuation system 48 is configured to pivot each propulsor blade 42 about its own respective blade pivot axis 46. By pivoting each propulsor blade 42 about its blade pivot axis 46, a pitch of the respective propulsor blade 42 may be changed. Note, while the blade pivot axis 46 is shown in FIG. 2 as being perpendicular to the propulsion system axis 24, it is contemplated this blade pivot axis 46 may or may not be coincident with the propulsion system axis 24. Moreover, it is contemplated each blade pivot axis 46 may alternatively be angularly offset from the propulsion system axis 24 by an acute angle or an obtuse angle when viewed, for example, in the longitudinal reference plane. Of course, it is contemplated some or all of the propulsor blades 42 may be alternatively moved to change the propulsor blade pitch. Moreover, it is contemplated some or all of the propulsor blades 42 may alternatively be fixed pitch propulsor blades in other embodiments.

The guide vane structure 36 of FIG. 1 includes a plurality of open exit guide vanes 50 (e.g., airfoils) that are arranged and may be equispaced circumferentially about the propulsion system axis 24 in an array; e.g., a circular array. This guide vane structure 36 and its guide vanes 50 are arranged axially next to (e.g., adjacent) the propulsor rotor 34 and its propulsor blades 42. The guide vane structure 36 and its guide vanes 50 of FIG. 1, for example, are arranged downstream of the propulsor rotor 34 and its propulsor blades 42, without (e.g., any) other elements axially therebetween to obstruct, turn and/or otherwise influence the air propelled by the propulsor rotor 34 to the guide vane structure 36 for example. Each of the guide vanes 50 of FIG. 1 is coupled to a support structure 52 of a stationary housing structure 54 for the aircraft propulsion system 20. This support structure 52 may be configured as or otherwise include a support frame, a case and/or another fixed structure of the housing structure 54. Each of the guide vanes 50 projects spanwise along a span line of the respective guide vane 50 (e.g., radially relative to the propulsion system axis 24) out from an exterior surface 56 of the housing structure 54, into the external environment 22, to the distal tip 58 of the respective guide vane 50. Here, the exterior surface 56 radially borders the external environment 22 and forms an exterior aerodynamic flow surface of the aircraft propulsion system 20. Each guide vane 50 is thereby configured as an un-ducted and unshrouded or shrouded guide vane which is exposed to (e.g., disposed in) the surrounding external environment 22.

Referring to FIG. 2, each guide vane 50 may be configured to pivot about a respective vane pivot axis 60. This vane pivot axis 60 extends radially relative to the propulsion system axis 24. The vane pivot axis 60 of FIG. 2, for example, is arranged perpendicular to the propulsion system axis 24 when viewed, for example, in the longitudinal reference plane. Each guide vane 50 of FIG. 2 is operatively coupled with a vane actuation system 62, which vane actuation system 62 may be discrete from or integrated as part of the blade actuation system 48. The vane actuation system 62 is configured to pivot each guide vane 50 about its own respective vane pivot axis 60. By pivoting each guide vane 50 about its vane pivot axis 60, a pitch of the respective guide vane 50 may be changed. Note, while the vane pivot axis 60 is shown in FIG. 2 as being perpendicular to the propulsion system axis 24, it is contemplated this vane pivot axis 60 may or may not be coincident with the propulsion system axis 24. Moreover, it is contemplated each vane pivot axis 60 may alternatively be angularly offset from the propulsion system axis 24 by an acute angle or an obtuse angle when viewed, for example, in the longitudinal reference plane. Of course, it is contemplated some or all of the guide vanes 50 may be alternatively moved to change the guide vane pitch. Moreover, it is contemplated some or all of the guide vanes 50 may alternatively be fixed pitch guide vanes in other embodiments.

Referring to FIG. 1, the turbine engine 32 includes an inlet section 64, a compressor section 65, a combustor section 66, a turbine section 67 and an exhaust section 68. The compressor section 65 of FIG. 1 includes a low pressure compressor (LPC) section 65A and a high pressure compressor (HPC) section 65B. The turbine section 67 of FIG. 1 includes a high pressure turbine (HPT) section 67A and a low pressure turbine (LPT) section 67B. The turbine engine 32 also includes an (e.g., annular) engine flowpath 70 which extends longitudinally through the aircraft propulsion system 20 of FIG. 1 and its turbine engine 32 from an (e.g., annular) airflow inlet 72 into the engine flowpath 70 to a (e.g., annular) combustion products exhaust 74 from the engine flowpath 70. The flowpath inlet 72 is also an airflow inlet into the aircraft propulsion system 20 of FIG. 1 and its turbine engine 32. The flowpath exhaust 74 is also a combustion products exhaust from the aircraft propulsion system 20 of FIG. 1 and its turbine engine 32. At least (or only) the LPC section 65A, the HPC section 65B, the combustor section 66, the HPT section 67A and the LPT section 67B collectively form a core 76 (e.g., a gas generator) of the turbine engine 32.

Each of the engine sections 65A, 65B, 67A and 67B includes a respective bladed rotor 78-81; e.g., a ducted and/or shrouded engine rotor. Each of these engine rotors 78-81 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 70. Each of the rotor blades is connected to the respective rotor base. Each of the rotor blades projects radially (e.g., spanwise) out from the respective rotor base into the engine flowpath 70 and to a distal tip of the respective rotor blade.

The HPC rotor 79 is coupled to and rotatable with the HPT rotor 80. The HPC rotor 79 of FIG. 1, for example, is connected to the HPT rotor 80 by a high speed shaft 84. At least (or only) the HPC rotor 79, the HPT rotor 80 and the high speed shaft 84 collectively form a high speed rotating structure 86; e.g., a high speed spool of the engine core 76. This high speed rotating structure 86 of FIG. 1 and its members 79, 80 and 84 are rotatable about the propulsion system axis 24. However, in other embodiments, the high speed rotating structure 86 and its members 79, 80 and 84 may alternatively be rotatable about another rotational axis which is (e.g., laterally and/or angularly) offset from the rotational axis of the propulsor rotor 34.

The LPC rotor 78 is coupled to and rotatable with the LPT rotor 81. The LPC rotor 78 of FIG. 1, for example, is connected to the LPT rotor 81 by a low speed shaft 88. At least (or only) the LPC rotor 78, the LPT rotor 81 and the low speed shaft 88 collectively form a low speed rotating structure 90; e.g., a low speed spool of the engine core 76. This low speed rotating structure 90 of FIG. 1 and its members 78, 81 and 88 are rotatable about the propulsion system axis 24. However, in other embodiments, the low speed rotating structure 90 and its members 78, 81 and 88 may alternatively be rotatable about another rotational axis which is (e.g., laterally and/or angularly) offset from the rotational axis of the propulsor rotor 34.

The low speed rotating structure 90 is coupled to the propulsor rotor 34 through a drivetrain 92. This drivetrain 92 may be configured as a geared drivetrain, where a geartrain 94 (e.g., a transmission, a speed change device, an epicyclic geartrain, etc.) is disposed between and operatively couples the propulsor rotor 34 to the low speed rotating structure 90 and its LPC rotor 78 and its LPT rotor 81. With this arrangement, the propulsor rotor 34 may rotate at a different (e.g., slower) rotational speed than the low speed rotating structure 90 and its LPC rotor 78 and its LPT rotor 81. Here, the propulsor rotor 34 and the low speed rotating structure 90 may rotate in a common (the same) direction about the propulsion system axis 24 or in opposite directions about the propulsion system axis 24 depending, for example, upon the specific configuration of the geartrain 94. Alternatively, the drivetrain 92 may be configured as a direct-drive drivetrain, where the geartrain 94 is omitted. With such an arrangement, the propulsor rotor 34 rotates at a common (the same) rotational speed as the low speed rotating structure 90 and its LPC rotor 78 and its LPT rotor 81.

The engine sections 64-68 may be arranged sequentially along the propulsion system axis 24 and are housed within and/or formed by the housing structure 54. This housing structure 54 includes an engine case 96 (e.g., a gas generator case) and a nacelle 98. The engine case 96 houses one or more of the engine sections 65A-67B; e.g., the engine core 76. The engine case 96 of FIG. 1, for example, extends axially along (e.g., axially overlaps) and extends circumferentially about (e.g., circumscribes) the engine sections 65A-67B and their respective bladed rotors 78-81. The engine case 96 may also house the geartrain 94. The nacelle 98 houses and provides an aerodynamic cover over the engine case 96. An exterior wall of the nacelle 98 of FIG. 1, for example, is disposed radially outboard of, extends axially along (e.g., axially overlaps) and extends circumferentially about (e.g., circumscribes) the engine core 76 and its engine case 96. This nacelle wall may at least partially or completely form the exterior surface 56. With the foregoing arrangement, the bladed rotors 78-81 are disposed within the housing structure 54. By contrast, the propulsor rotor 34 and the guide vane structure 36 are disposed at least partially (or completely) outside of the housing structure 54.

During operation of the aircraft propulsion system 20 of FIG. 1, ambient air within the external environment 22 is propelled by the rotating propulsor rotor 34 in the downstream, aft direction towards the propulsion system aft end 28. A major portion (e.g., more than 50%) of this air bypasses the turbine engine 32 to provide forward thrust while a minor portion (e.g., less than 50%) of the air flows into the turbine engine 32. For example, an outer stream of the air propelled by the rotating propulsor rotor 34 flows axially across the guide vane structure 36 and outside of the housing structure 54 and its exterior surface 56; e.g., along an exterior of the nacelle 98. The guide vane structure 36 conditions (e.g., straightens out, de-swirls, etc.) the outer stream of air within the external environment 22 to enhance the forward thrust. By contrast, an inner stream of the air propelled by the rotating propulsor rotor 34 may bypass the guide vane structure 36 and enter the turbine engine 32 and its engine flowpath 70 through the flowpath inlet 72. The air entering the engine flowpath 70 through the flowpath inlet 72 may be referred to as "core air".

The core air is compressed by the LPC rotor 78 and the HPC rotor 79 and directed into a combustion chamber 100 (e.g., an annular combustion chamber) of a combustor 102 (e.g., an annular combustor) in the combustor section 66. Fuel is injected into the combustion chamber 100 by one or more fuel injectors 104 and mixed with the compressed core air to provide a fuel-air mixture. This fuel-air mixture is ignited and combustion products thereof flow through and sequentially drive rotation of the HPT rotor 80 and the LPT rotor 81. The rotation of the HPT rotor 80 and the LPT rotor 81 respectively drive rotation of the HPC rotor 79 and the LPC rotor 78 and, thus, compression of the core air. The rotation of the LPT rotor 81 also drives the rotation of the propulsor rotor 34 through the geartrain 94. The turbine engine 32 and its low speed rotating structure 90 thereby power operation of (e.g., drive rotation of) the propulsor rotor 34 during aircraft propulsion system operation.

Figure 3:
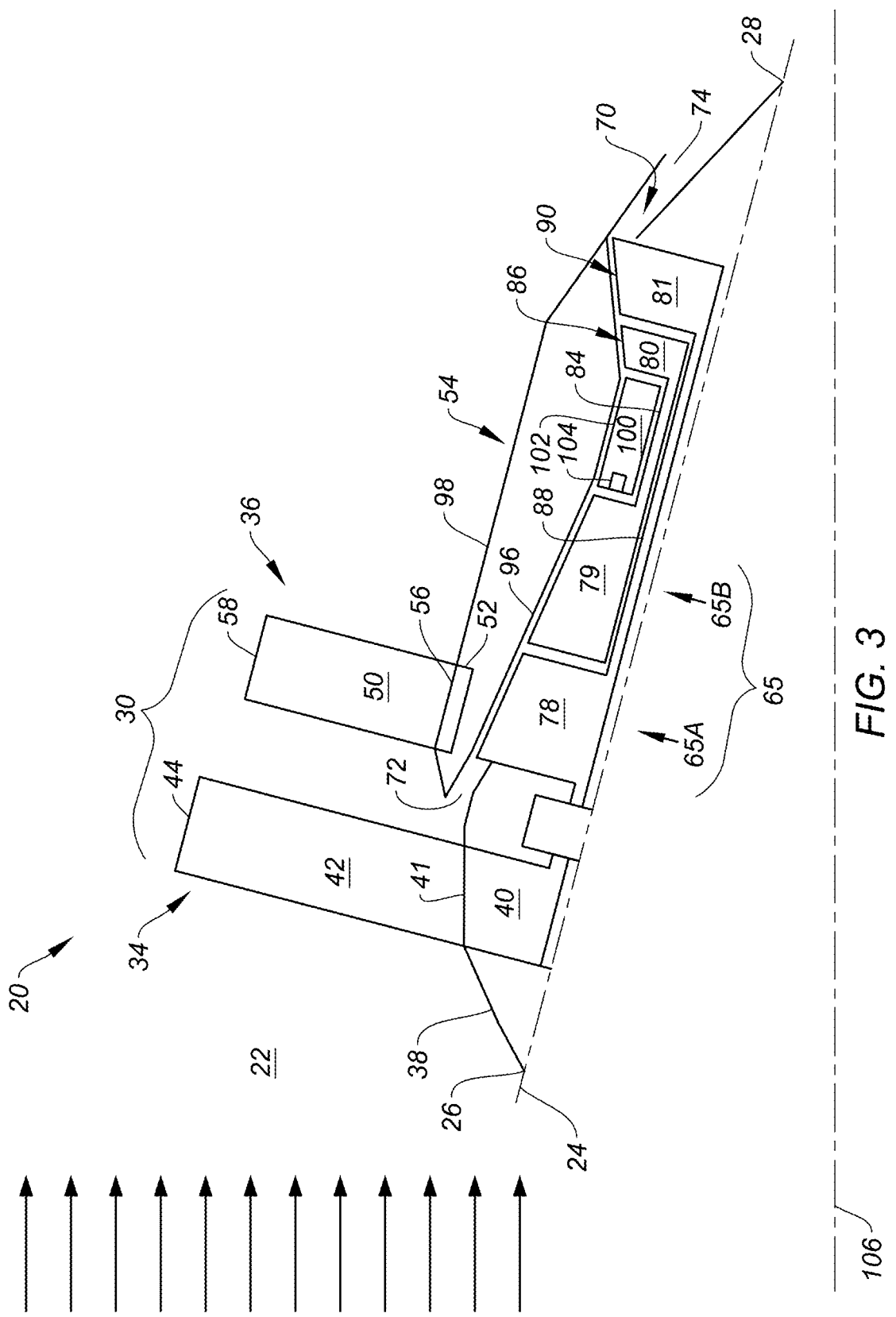
FIG. 3 is a partial schematic sectional illustration of the aircraft propulsion system during aircraft climb.

Referring to FIG. 3, during certain flight conditions such as aircraft climb and aircraft descent, the propulsion system axis 24 may be angularly offset from a flow of incoming free stream air. Here, the propulsion system axis 24 of FIG. 3 is also angularly offset from a horizon line 106. Under certain conditions, a non-uniform flow of the free stream air over the propulsor rotor 34 and into the engine flowpath 70 through its flowpath inlet 72 can generate distortions in the core air flowing in the engine flowpath 70 to the compressor section 65. Moreover, boundary layer air may choke as that air passes between root regions of adjacent propulsor blades 42 next to the inner platform 41. Such root choke may further disrupt the core air flowing in the engine flowpath 70 to the compressor section 65. These air flow distortions/disruptions may be challenging to normal operation of the compressor section 65. Of course, similar air flow distortions/disruptions may also be present during certain straight and level flight conditions; e.g., at relatively slow flight speeds and/or at relatively high altitudes where ambient air density is relatively low. To reduce such air flow distortions/disruptions, the nose cone 38 of the present disclosure is configured to reset, ingest and/or otherwise influence the boundary layer air flowing along the nose cone 38 prior to reaching the propulsor rotor 34. Various configurations of this nose cone 38 are described below including those illustrated in FIGS. 4-7. The present disclosure, however, is not limited to such exemplary arrangements.

Figure 6:
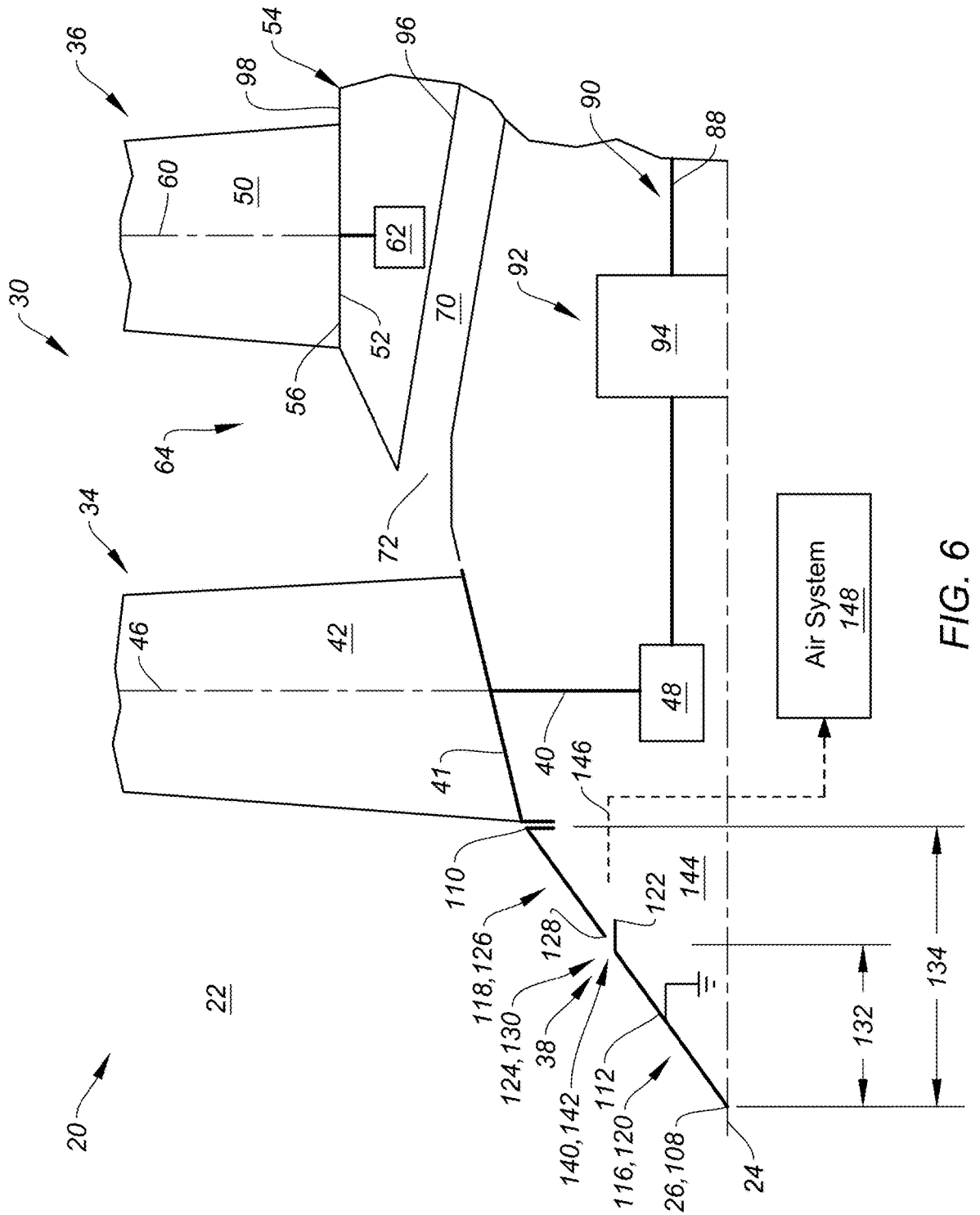
Figure 7:
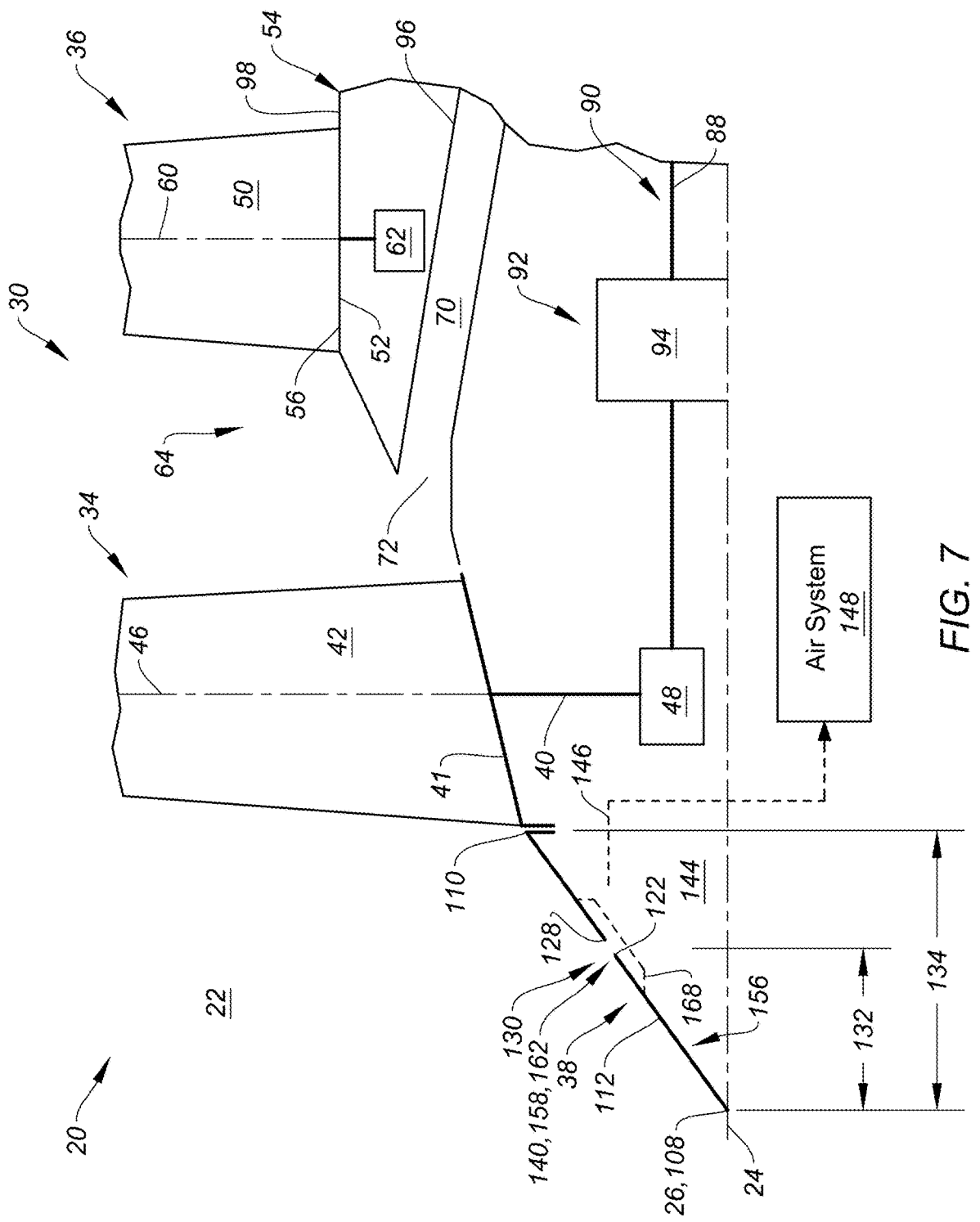
Figure 8:
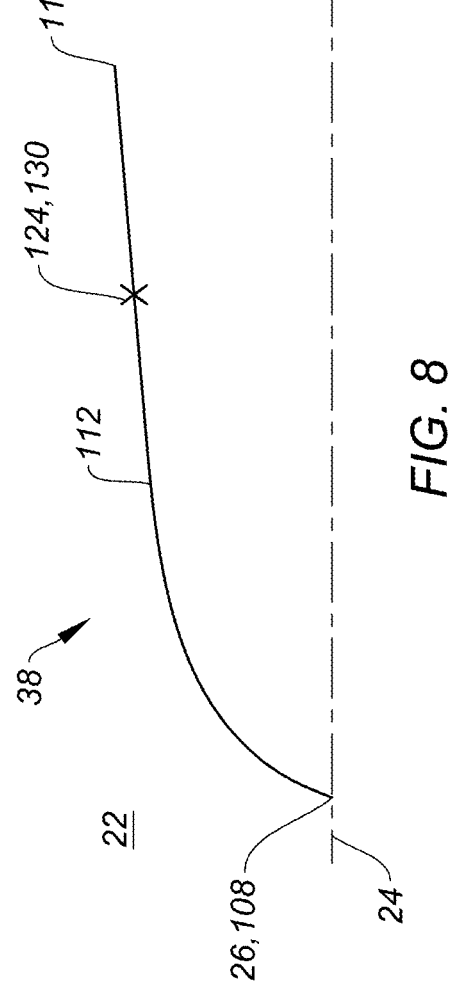
FIGS. 8 and 9 are partial schematic sectional illustrations of the nose cone with various sectional geometries.
Figure 9:
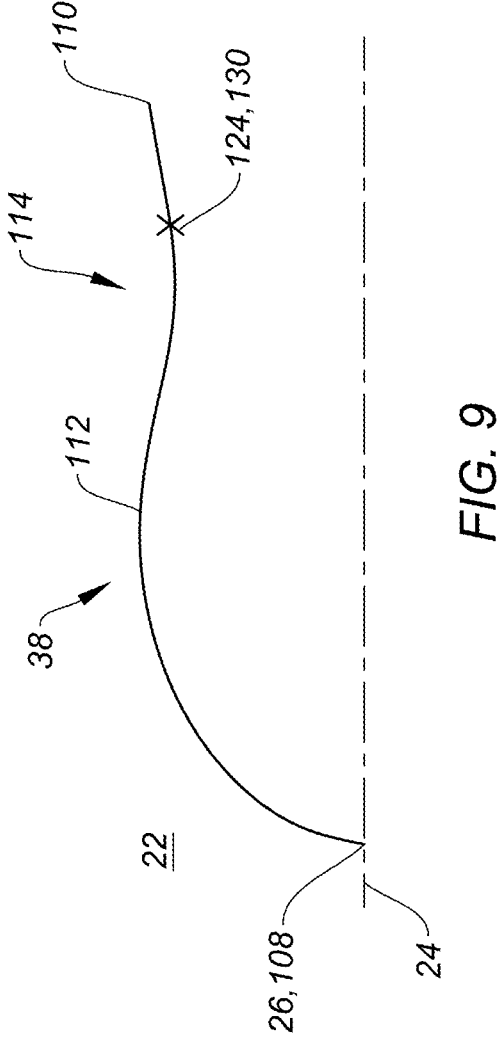

Referring to FIGS. 4-7, the nose cone 38 extends axially along the propulsion system axis 24 from an axial upstream, forward tip end 108 of the nose cone 38 to an axial downstream, aft base end 110 of the nose cone 38. The nose cone tip end 108 of FIGS. 4-7 is also the propulsion system forward end 26. The nose cone base end 110 of FIGS. 4-7 is axially adjacent, borders and/or otherwise neighbors the propulsor rotor 34 and its inner platform 41 and/or its rotor base 40. The nose cone 38 projects radially out to a radial outer exterior side 112 of the nose cone 38. At least a portion or an entirety of the nose cone exterior side 112 radially tapers as the nose cone 38 extends in an axial forward direction along the propulsion system axis 24 to the nose cone tip end 108. Note, while the nose cone exterior side 112 is generally shown in FIGS. 4-7 with a conical geometry, the nose cone 38 of the present disclosure is not limited thereto. For example, referring to FIGS. 8 and 9, at least a portion or an entirety of a sectional geometry of a half of the nose cone exterior side 112 may be rounded, arcuate, splined and/or otherwise curved when viewed, for example, in the longitudinal reference plane. In FIG. 8, the nose cone exterior side 112 continuously radially tapers from the nose cone base end 110 to the nose cone tip end 108. In FIG. 9, the nose cone exterior side 112 includes a depression 114; e.g., a concave portion along the sectional geometry of the nose cone exterior side 112.

Figure 4:
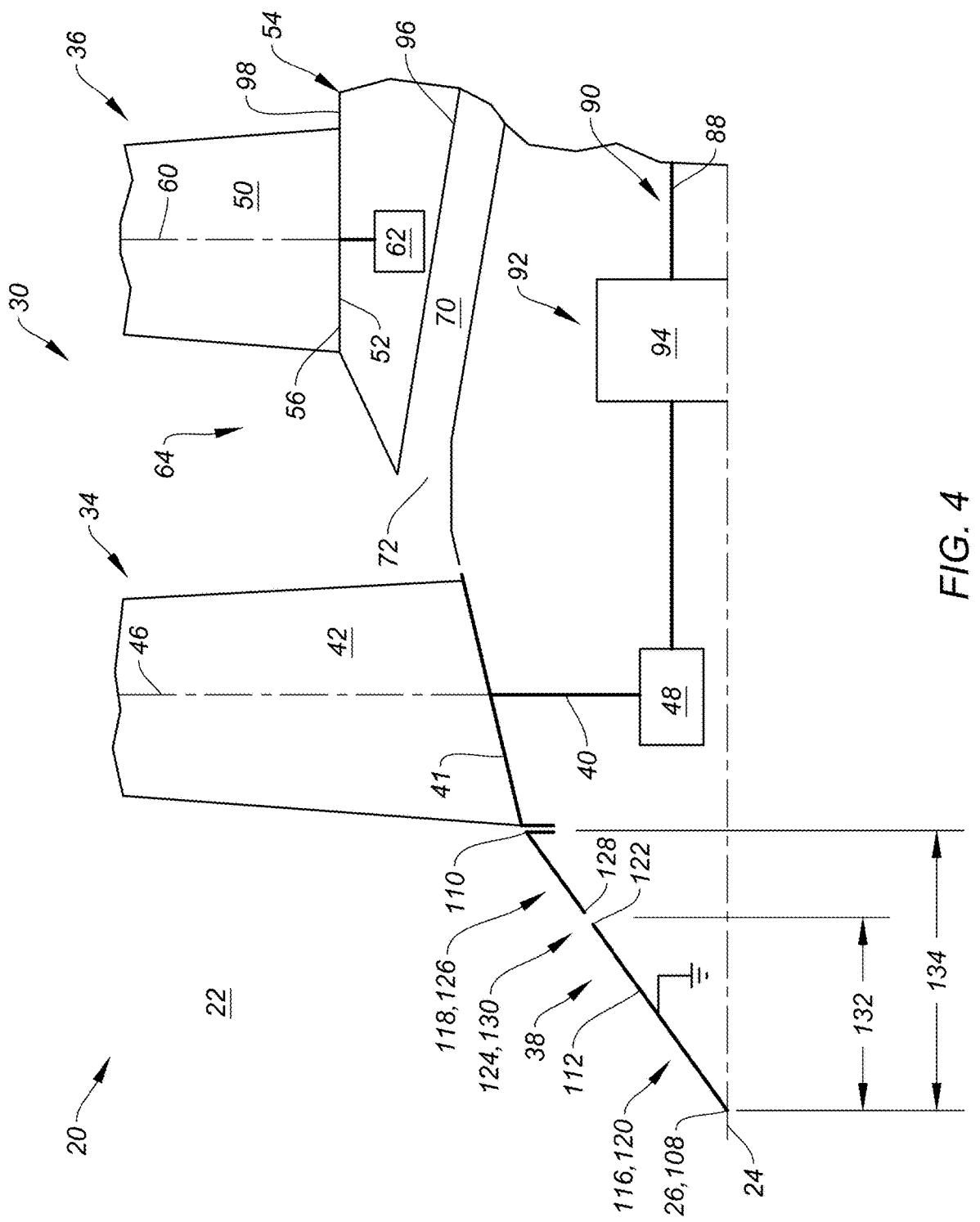
FIGS. 4-7 are partial schematic sectional illustrations of the aircraft propulsion system at the propulsion section with various nose cone arrangements.
Figure 5:
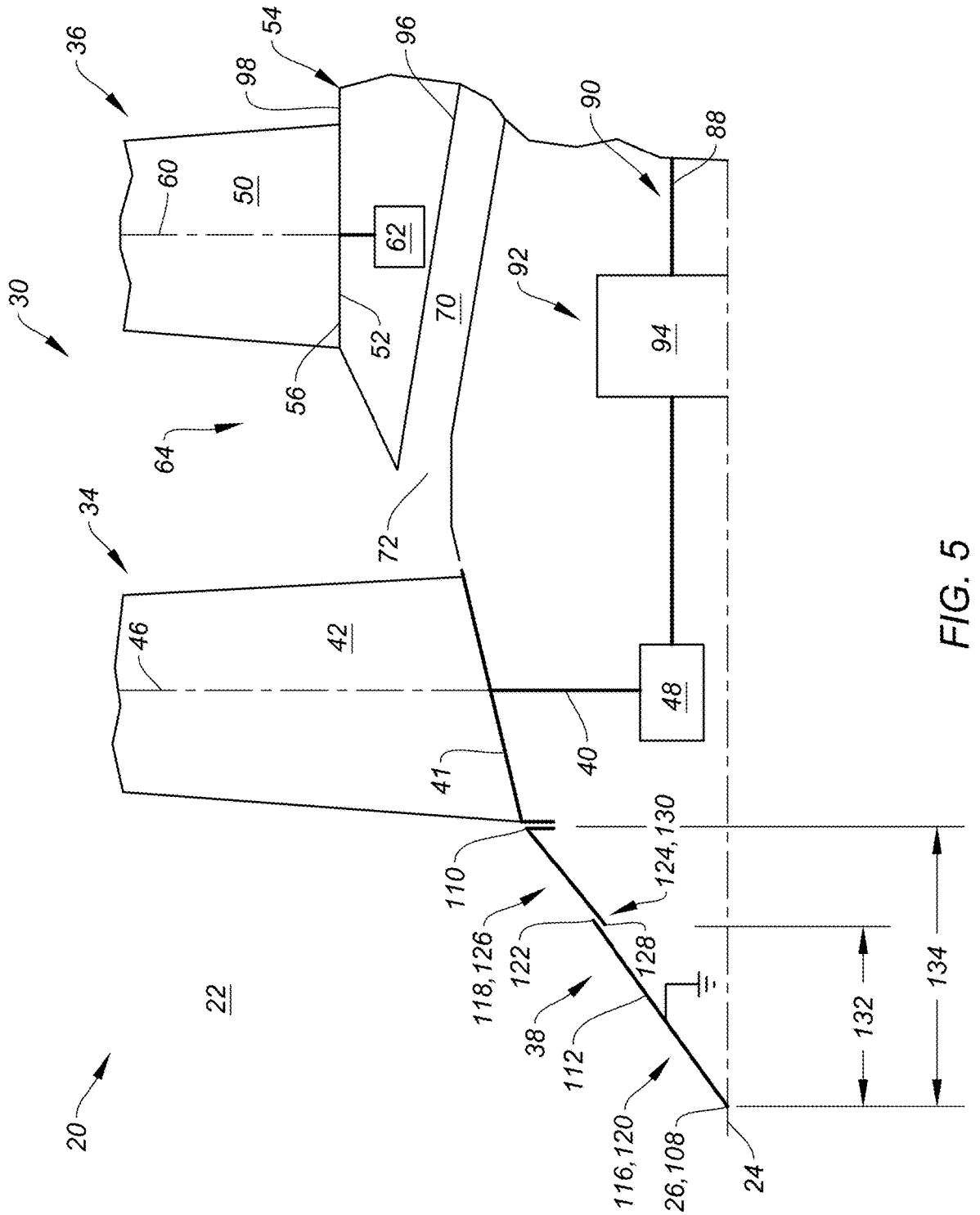

Referring to FIGS. 4-6, the nose cone 38 may be configured as an axially segmented nose cone; e.g., a multipiece nose cone. The nose cone 38 of FIGS. 4-6, for example, includes an upstream, forward stationary section 116 and a downstream, aft rotating section 118. The stationary section 116 is anchored to a stationary support structure of the aircraft propulsion system 20 such that the stationary section 116 remains stationary and does not rotate about the propulsion system axis 24 during aircraft propulsion system operation. By contrast, the rotating section 118 is configured to rotate with the propulsor rotor 34 about the propulsion system axis 24 during aircraft propulsion system operation. The rotating section 118, for example, may be mechanically fastened (e.g., bolted) and/or otherwise removably attached to the propulsor rotor 34, axially forward and upstream of the propulsor rotor 34 and its members 40 and/or 41.

The stationary section 116 includes an exterior sidewall 120 ("stationary sidewall"). The stationary section 116 and its stationary sidewall 120 extend axially along the propulsion system axis 24 from an axial downstream, aft end 122 of the stationary section 116 to the nose cone tip end 108. The aft end 122 of the stationary section 116 is located downstream and axially aft of the nose cone tip end 108 at an inter-section junction 124 between the stationary section 116 and the rotating section 118. The stationary sidewall 120 extends circumferentially about (e.g., completely around) the propulsion system axis 24 and is disposed at the nose cone exterior side 112. The stationary sidewall 120 thereby forms a radial outer, exterior flow surface along the stationary section 116 bordering the external environment 22.

The rotating section 118 includes an exterior sidewall 126 ("rotating sidewall"). The rotating section 118 and its rotating sidewall 126 extends axially along the propulsion system axis 24 from an axial upstream, forward end 128 of the rotating section 118 to the nose cone base end 110. The forward end 128 of the rotating section 118 is located upstream and axially forward of the nose cone base end 110 at the inter-section junction 124. The rotating sidewall 126 extends circumferentially about (e.g., completely around) the propulsion system axis 24 and is disposed at the nose cone exterior side 112. The rotating sidewall 126 thereby forms a radial outer, exterior flow surface along the rotating section 118 bordering the external environment 22.

The inter-section junction 124 is disposed at an axially intermediate location 130 along the nose cone 38 between the nose cone tip end 108 and the nose cone base end 110. This intermediate location 130 is selected to tailor how the boundary layer air flow is reset, ingested and/or otherwise influenced along the nose cone 38. The intermediate location 130 of FIGS. 4-6 (see also FIG. 7), for example, is axially spaced from the nose cone tip end 108 by an axial distance 132. This axial distance 132 may be equal to or greater than forty percent (40%) or fifty percent (50%) of an axial length 134 of the nose cone 38. Briefly, the nose cone axial length 134 is measured axially along the propulsion system axis 24 between the nose cone tip end 108 and the nose cone base end 110. The axial distance 132 may also or alternatively be equal to or less than ninety percent (90%) or eighty percent (80%) of the nose cone axial length 134. The axial distance 132, for example, may be between fifty percent (50%) and eighty percent (80%) of the nose cone axial length 134, inclusive. More particularly, in some embodiments, the axial distance 132 may be between fifty percent (50%) and sixty-five percent (65%), inclusive. In other embodiments, the axial distance 132 may be between sixty-five percent (65%) and eight percent (80%), inclusive. Of course, depending on a trip point for laminar flow along the nose cone 38, the axial distance 132 may alternatively be less than forty percent (40%) of the nose cone axial length 134.

In some embodiments, referring to FIG. 4, the stationary sidewall 120 may be arranged substantially or completely flush with rotating sidewall 126 at the inter-section junction 124. For example, a sectional geometry of the stationary sidewall 120 at its downstream end 122 and a sectional geometry of the rotating sidewall 126 at its upstream end 128 may follow a common (e.g., smooth) trajectory. This inter-section junction 124 between the stationary section 116 and the rotating section 118 may minimize tripping of the boundary layer air, while still shearing the boundary layer air at the transition from the stationary section 116 to the rotating section 118.

In some embodiments, referring to FIGS. 5 and 6, the stationary sidewall 120 and the rotating sidewall 126 may extend axially along one another at the inter-section junction 124. The stationary sidewall 120 of FIG. 5, for example, is disposed radially outboard of and axially overlaps the rotating sidewall 126 at the inter-section junction 124. With this arrangement, the stationary sidewall 120 and the rotating sidewall 126 provide the inter-section junction 124 with a waterfall-type configuration. More particularly, the cross-sectional geometry of the nose cone exterior side 112 of FIG. 5 has a step-down at the inter-section junction 124 between the stationary section 116 and the rotating section 118. In another example, the rotating sidewall 126 of FIG. 6 is disposed radially outboard of and axially overlaps the stationary sidewall 120 at the inter-section junction 124. With this arrangement, the stationary sidewall 120 and the rotating sidewall 126 provide the inter-section junction 124 with a dam-type configuration. More particularly, the cross-sectional geometry of the nose cone exterior side 112 of FIG. 6 has a step-up at the inter-section junction 124 between the stationary section 116 and the rotating section 118. Both the waterfall-type configuration of FIG. 5 and the dam-type configuration of FIG. 6 may be used to trip laminar boundary layer air to a turbulent state and/or locally accelerate the laminar boundary layer air flowing along the nose cone 38 at the inter-section junction 124. While inducing turbulence may create some loss, turbulent air may be more stable and more readily directed downstream.

Figures 10, 11:
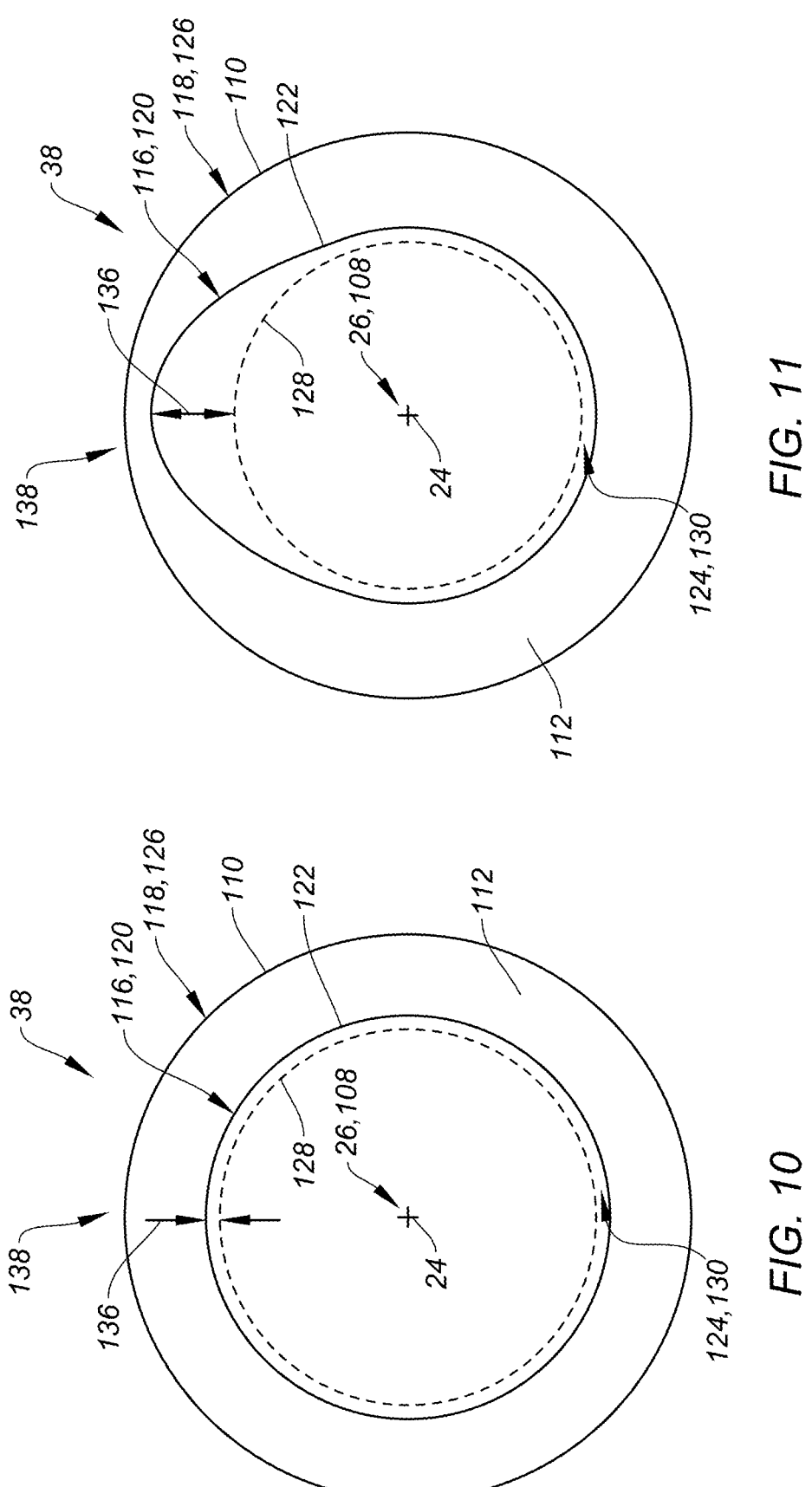
FIGS. 10 and 11 are end view illustrations of the nose cone with various stationary section arrangements.

In some embodiments, referring to FIG. 10, the overlap at the inter-section junction 124 between the stationary sidewall 120 and the rotating sidewall 126 may be symmetrical about the propulsion system axis 24. For example, an overlap dimension 136 between the stationary sidewall 120 and the rotating sidewall 126 may remain uniform (e.g., constant) as the nose cone 38 extends circumferentially around the propulsion system axis 24. In other embodiments, referring to FIG. 11, the overlap between the stationary sidewall 120 and the rotating sidewall 126 may be asymmetrical about the propulsion system axis 24. For example, the overlap dimension 136 between the stationary sidewall 120 and the rotating sidewall 126 may change (e.g., increase, decrease, fluctuate, etc.) as the nose cone 38 extends circumferentially around the propulsion system axis 24. With this arrangement, the overlap may be tailored for select aircraft maneuvers and/or flight conditions. For example, where the greatest overlap region is disposed at a top-dead-center (TDC) location 138, the overlap may be tailored for aircraft climb for example.

In some embodiments, referring to FIG. 6, the nose cone 38 may be configured with an air scoop 140 at the inter-section junction 124. This air scoop 140 may be collectively formed by (a) the stationary section 116 and its stationary sidewall 120 and (b) the rotating section 118 and its rotating sidewall 126. The air scoop 140 of FIG. 6, for example, includes a slot 142 (e.g., an annular gap) formed by and extending radially between the stationary sidewall 120 and the rotating sidewall 126. This slot 142 extends within the nose cone 38 circumferentially about (e.g., completely around) the propulsion system axis 24, thereby providing the slot 142 and, thus, the air scoop 140 with a full-hoop (e.g., annular) geometry. The slot 142 also extends axially through the nose cone 38 thereby fluidly coupling the external environment 22 outside of the nose cone 38 with an interior volume 144 (e.g., cavity) within the nose cone 38. With this arrangement, rather than tripping the boundary layer air at the inter-section junction 124, the air scoop 140 and its slot 142 may facilitate partial or complete ingestion of the boundary layer air into an interior of the nose cone 38; e.g., the interior volume 144. The boundary layer growth may thereby be partially or completely reset downstream of the inter-section junction 124 with new air.

Figure 12:
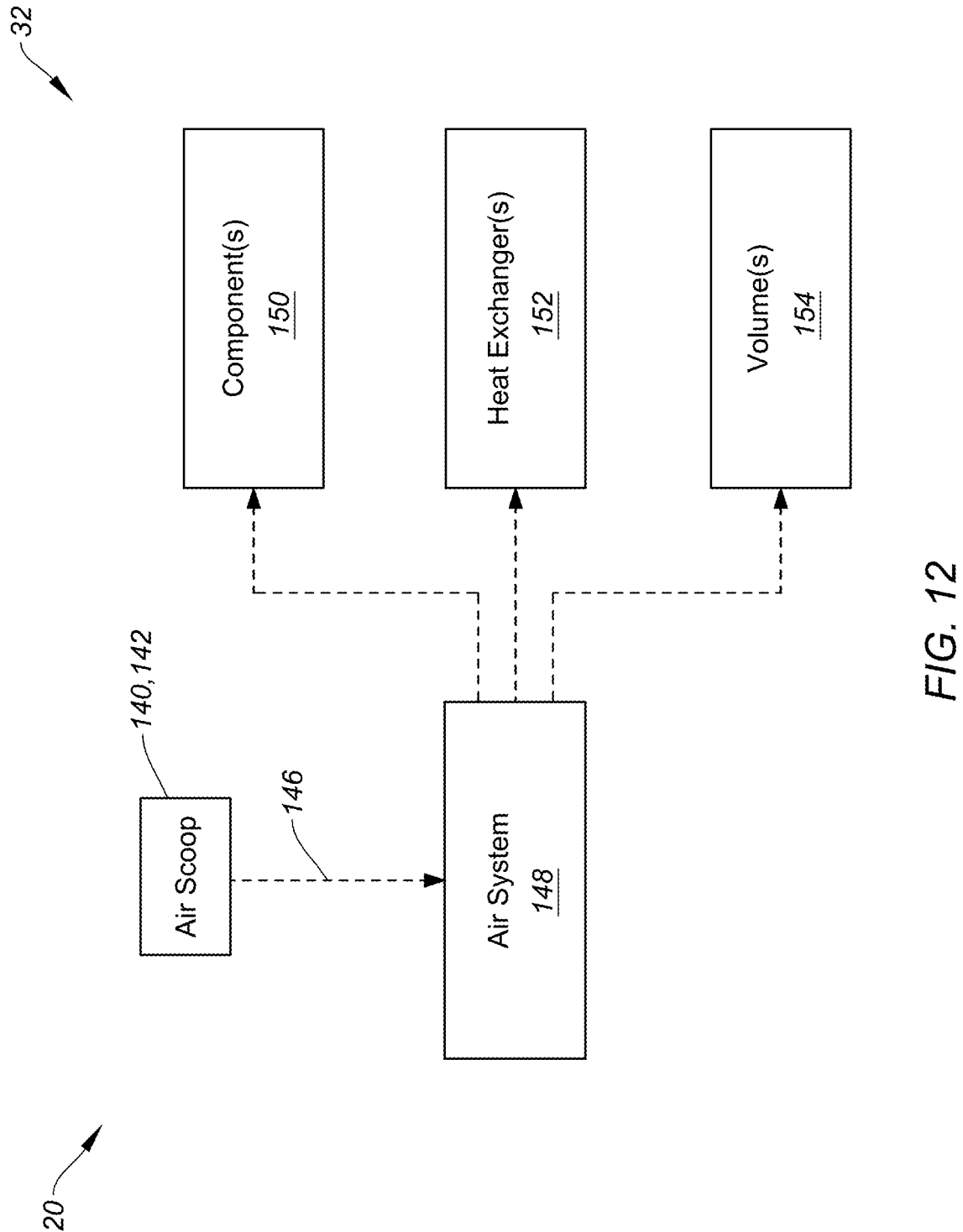
FIG. 12 is a schematic illustration of an air system coupled to a nose cone air scoop and various other propulsion system members.

The air ingested/directed into the nose cone 38 by the air scoop 140 and its slot 142 may be used for various purposes by the aircraft propulsion system 20. An air passage 146 internal to the aircraft propulsion system 20, for example, may fluidly couple the air scoop 140 and its slot 142 to an air system 148 within the aircraft propulsion system 20. Here, the air passage 146 includes the interior volume 144 within the nose cone 38. Referring to FIG. 12, the air system 148 may be configured to direct the air received from the air scoop 140 and its slot 142 to one or more internal components 150 of the aircraft propulsion system 20 to directly cool those components 150. Examples of the internal components 150 include, but are not limited to, the blade actuation system 48 (see FIG. 2), the vane actuation system 62 (see FIG. 2), the geartrain 94 (see FIG. 1) and/or other components of the drivetrain 92 (see FIG. 1), and/or various other air cooled component(s) of the aircraft propulsion system 20 and its turbine engine 32. The air system 148 may also (or alternatively) be configured to direct the air to one or more heat exchangers 152 (e.g., air-to-air heat exchanger(s) and/or air-to-liquid heat exchanger(s)). Such heat exchangers 152 may use the air to cool another working fluid flowing within the aircraft propulsion system 20 and its turbine engine 32. Examples of the working fluid include, but are not limited to, lubricant, fuel, coolant, core air, bleed air or the like. The air system 148 may still also (or alternatively) be configured to direct the air to one or more other internal volumes 154 (e.g., compartments, passages, cavities, etc.) within the aircraft propulsion system 20 to purge air out of those internal volumes 154. The air received from the air scoop 140 and its slot 142 may thereby be used to facilitate venting of the internal volume(s) 154 within the aircraft propulsion system 20. Examples of the internal volumes 154 include, but are not limited to, a core compartment between the engine case 96 and the nacelle 98 (see FIG. 1), a bearing compartment, a drivetrain compartment, and/or the like.

The nose cone 38 described above of FIGS. 4-6 with its stationary section 116 and its rotating section 118 provides the aircraft propulsion system 20 with a hybrid nose cone which provides a cross between a fixed nose cone and a rotating nose cone. The present disclosure, however, is not limited to such an exemplary nose cone configuration. For example, referring to FIG. 7, the nose cone 38 may alternatively be configured as a full rotating nose cone; e.g., a spinner. More particularly, the entire nose cone 38 of FIG.

7 from the nose cone base end 110 to the nose cone tip end 108 is attached to and rotatable with the propulsor rotor 34. Here, the nose cone 38 may include a single exterior sidewall 156 which replaces the stationary sidewall 120 and the rotating sidewall 126 described above. However, the nose cone 38 of FIG. 7 is still configured with the air scoop 140 at the intermediate location 130 to reset, ingest and/or otherwise influence the boundary layer air flow along the nose cone 38 prior to reaching the propulsor rotor 34.

Figure 13:
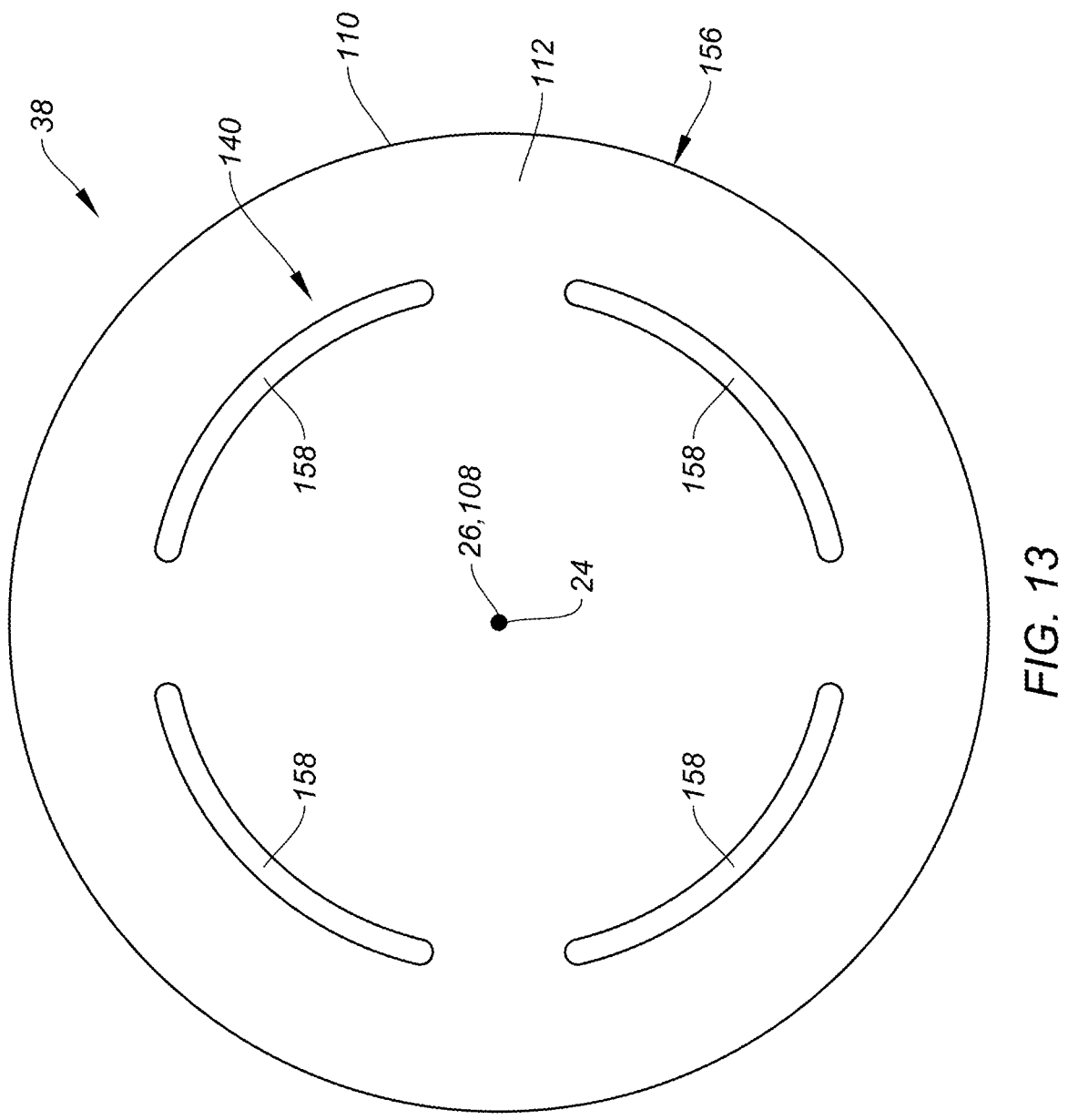
FIG. 13 is an end view illustration of the nose cone with an array of apertures.

Referring to FIG. 13, the air scoop 140 for the full rotating nose cone 38 may include one or more apertures 158 (e.g., slots, holes, etc.) in the exterior sidewall 156. Each of these apertures 158 projects through the exterior sidewall 156 to fluidly couple the external environment 22 to the interior volume 144/the air system 148 (see FIG. 7) as described above. The apertures 158 of FIG. 13 are arranged and may (or may not) be equispaced circumferentially about the propulsion system axis 24 in at least (or only) one array; e.g., a circular array. While each of the apertures 158 of FIG. 13 has a common geometry (e.g., size and shape), it is contemplated one or more of the apertures 158 may alternatively have a different geometry (e.g., size and/or shape) than another one or more of the other apertures 158. While the apertures 158 of FIG. 13 are axially and/or radially aligned along the nose cone exterior side 112, it is contemplated one or more of the apertures 158 may be radially and/or axially offset from one or more of the other apertures 158. Moreover, while each of the apertures 158 of FIG. 13 is circumferentially offset from the other apertures 158, it is contemplated one or more of the apertures 158 may alternative circumferentially overlap another one or more of the other apertures 158 where, for example, the apertures 158 are arranged into two or more arrays along the nose cone exterior side 112.

Figures 14, 15, 16, 17, 18:
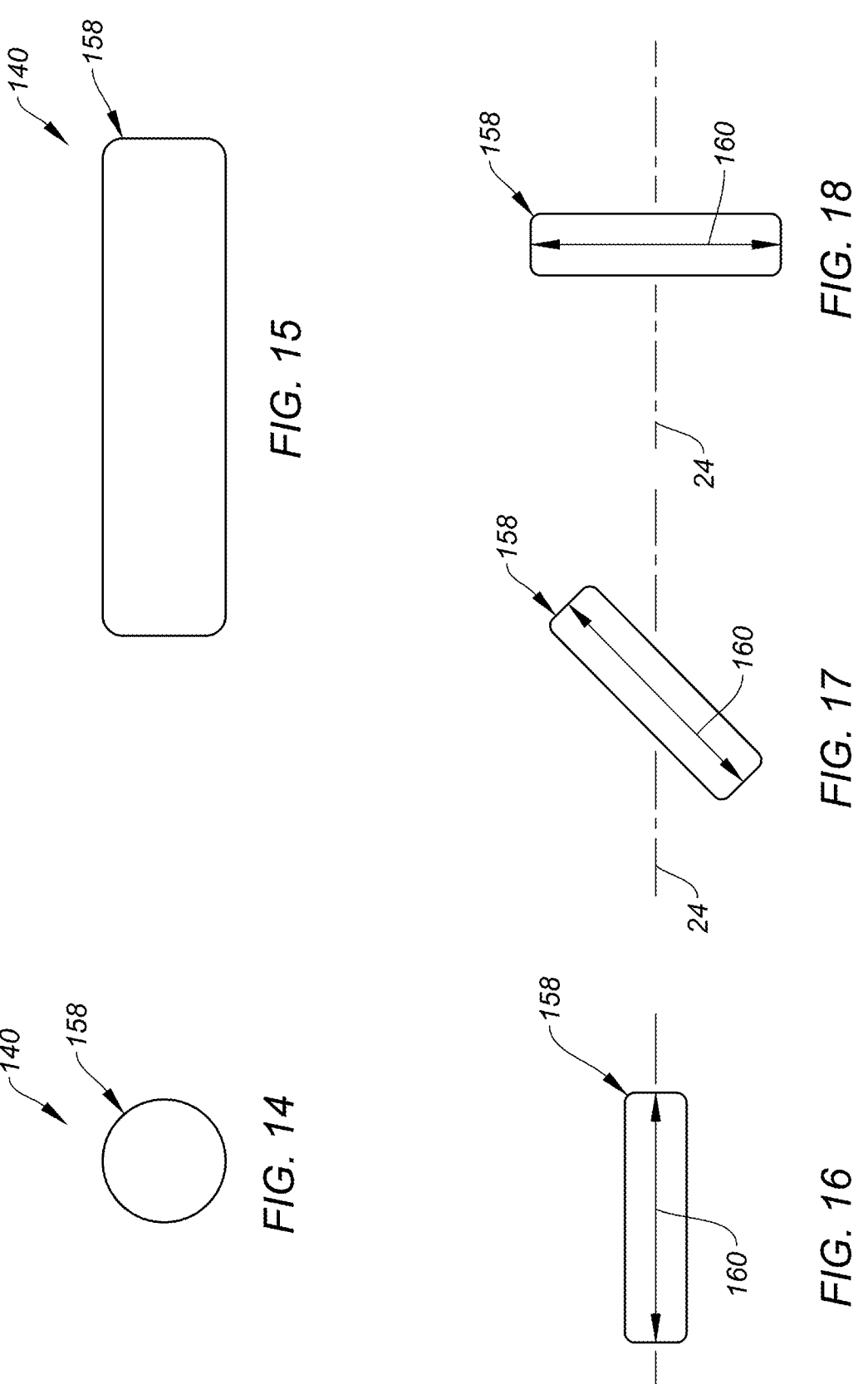
FIGS. 14-18 are schematic illustrations of a nose cone aperture with various arrangements.

The apertures 158 forming the air scoop 140 may have various geometric shapes and orientations. These aperture shapes may be axisymmetric shapes or non-axisymmetric shapes. An example of the axisymmetric shape is a circle (see FIG. 14). Examples of the non-axisymmetric shape include an elongated shape (see FIG. 15), a polygonal shape, an oval shape, and the like. Referring to FIG. 16, where the aperture shape is elongated, a major axis 160 of the aperture shape may be parallel with the propulsion system axis 24. Alternatively, referring to FIG. 17, the major axis 160 of the aperture shape may be angularly offset from the propulsion system axis 24 by an offset angle; e.g., a non-zero acute angle. Still alternatively, referring to FIG. 18, the major axis 160 of the aperture shape may be perpendicular to the propulsion system axis 24.

Figure 19:
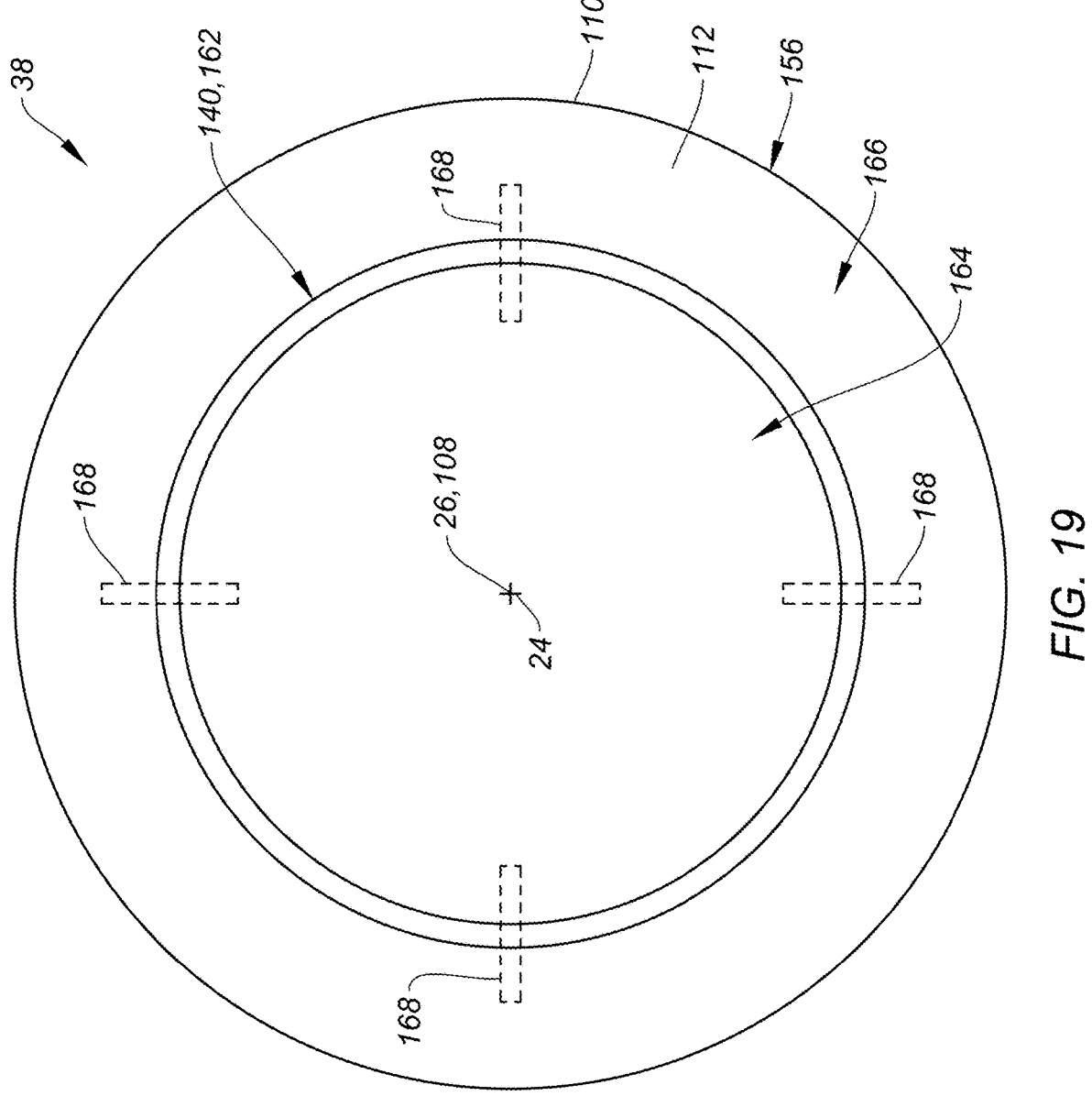
FIG. 19 is an end view illustration of the nose cone with another arrangement.

In some embodiments, referring to FIG. 13, the full rotating nose cone 38 may be configured with multiple apertures 158 to form the air scoop 140. In other embodiments, referring to FIG. 19, the air scoop 140 in the full rotating nose cone 38 may be configured from or otherwise include an annular slot 162. With such an arrangement, a forward portion 164 of the exterior sidewall 156 may be structurally tied to an aft portion 166 of the exterior sidewall 156 by one or more internal supports 168; see also FIG. 7.

Figure 20:
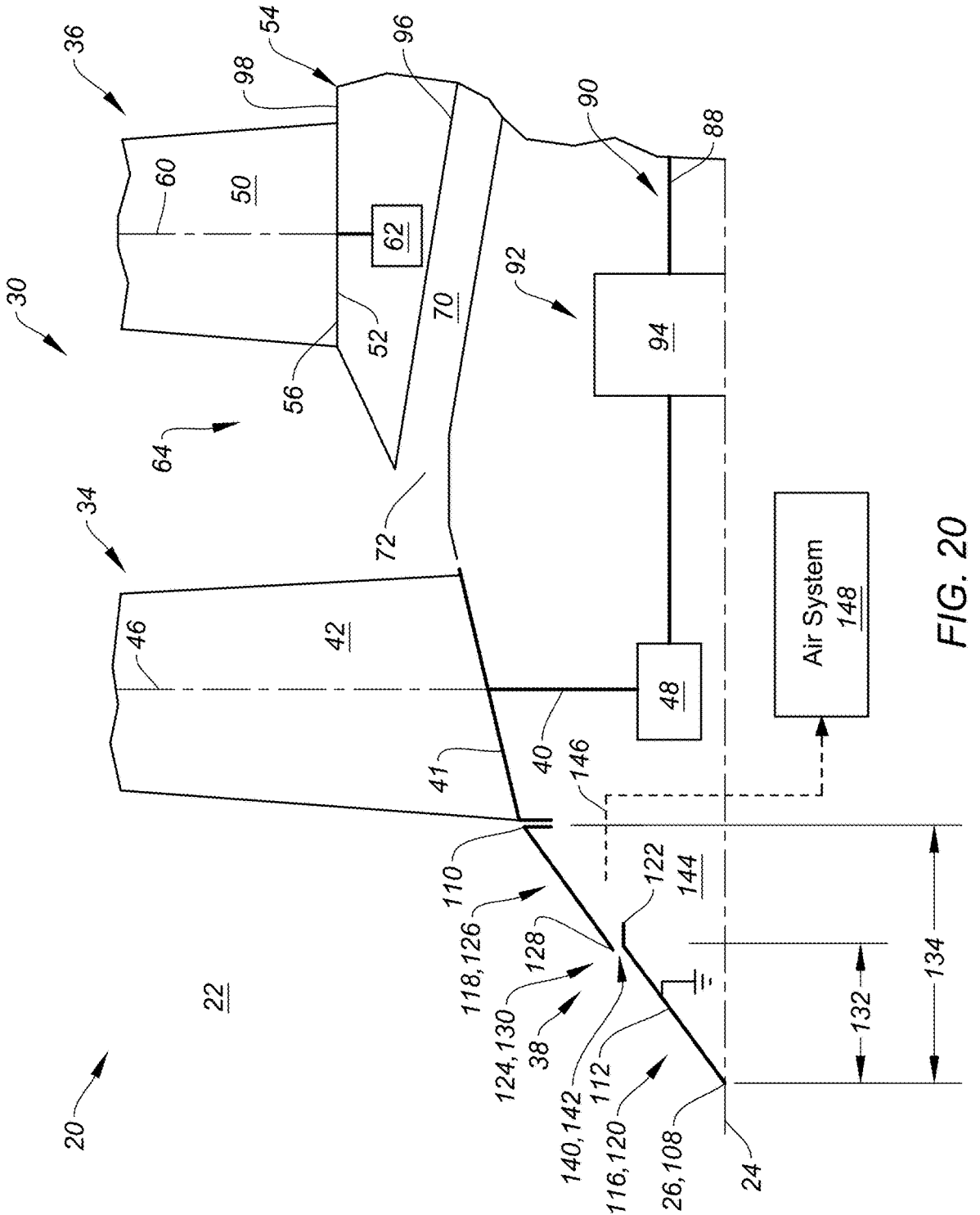
FIGS. 20 and 21 are partial schematic sectional illustrations of the aircraft propulsion system at the propulsion section with various other nose cone arrangements.

In some embodiments, referring to FIG. 6, a portion of the stationary section 116 and a portion of the rotating section 118 at the inter-section junction 124 may be aligned; e.g., flush. In other embodiments, referring to FIG. 20, the portion of the stationary section 116 and the portion of the rotating section 118 at the inter-section junction 124 may be offset. The forward end 128 of the rotating section 118, for example, may project axially forward of a portion of the nose cone exterior side 112 defined by the rotating section 13 14

Figure 21:
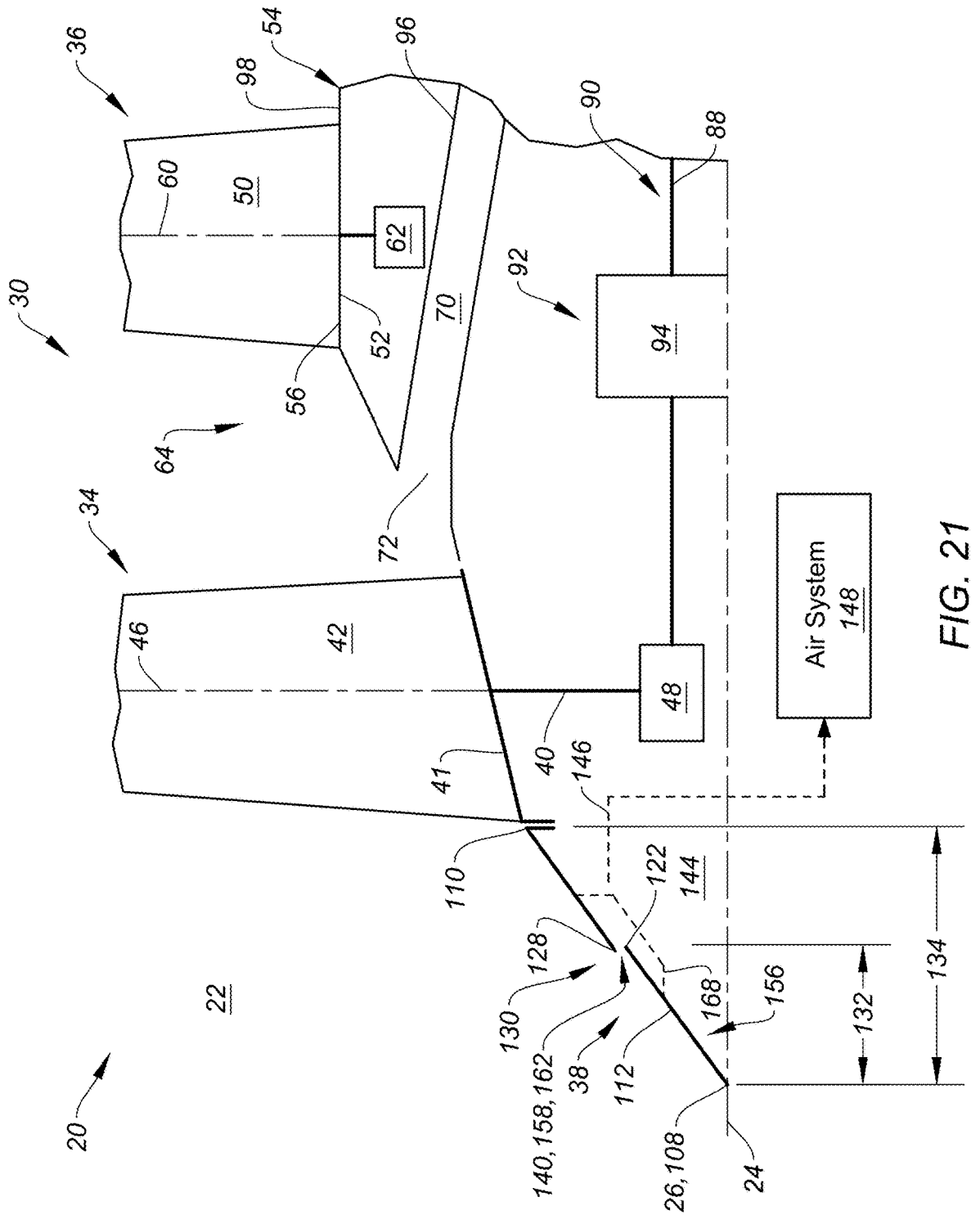

118 at the inter-section junction 124. With this arrangement, a step is formed between the stationary section 116 and the portion of the rotating section 118 at the inter-section junction 124. Similarly, referring to FIG. 21, a step may also be formed in the full rotating nose cone 38 at the air scoop 140.

The engine flowpath 70 of FIG. 1 extends longitudinally from the flowpath inlet 72, sequentially through the inlet section 64, the LPC section 65A, the HPC section 65B, the combustor section 66, the HPT section 67A, the LPT section 67B and the exhaust section 68, to the flowpath exhaust 74. The engine flowpath 70 of FIG. 1 is configured such that the core air and the combustion products generally flow in the aft, downstream direction towards the propulsion system aft end 28. The core air and the combustion products thereby flow along with the ambient air propelled by the rotating propulsor rotor 34 in a common axial direction—the downstream, aft direction. The turbine engine 32 of the present disclosure, however, is not limited to such an exemplary common flow engine arrangement. For example, the engine flowpath 70 may alternatively be configured such that the core air and the combustion products generally flow in a forward, upstream direction towards the propulsion system forward end 26. The core air and the combustion products may thereby flow in an opposite direction as the ambient air propelled by the rotating propulsor rotor 34. Here, the turbine engine 32 may have a reverse flow engine arrangement.

While the turbine engine 32 is described above with a particular two rotating structure arrangement, the present disclosure is not limited thereto. For example, the LPC rotor 78 may be omitted to configure the LPT rotor 81 as a power turbine (PT) rotor for the propulsor rotor 34. In another example, the turbine engine 32 may also include another rotating structure; e.g., an intermediate speed spool for the engine core 76.

The guide vane structure 36 is described above as a fixed (e.g., non-rotatable) guide vane structure. It is contemplated, however, the guide vane structure 36 may alternatively be selectively rotatable about the propulsion system axis 24. With such an arrangement, the aircraft propulsion system 20 may be configured as an open rotor propulsion system with a swirl recovery blade (SRB) open rotor architecture. More particularly, the aircraft propulsion system 20 may operate as: (A) a counter-rotating open rotor (CROR) propulsion system during a dual rotor mode of operation (e.g., when both the propulsor rotor 34 and the structure 36 are counter-rotating about the propulsion system axis 24); and (B) a single open rotor and swirl recovery vane (SRV) propulsion system during a single rotor mode of operation (e.g., when the propulsor rotor 34 is rotating and the structure 36 is rotationally fixed about the propulsion system axis 24). Note, when the guide vane structure 36 is configured to selectively rotate about the propulsion system axis 24, the moving guide vanes 50 operate as propulsor blades.

The aircraft propulsion system 20 is described above as including the propulsor rotor 34 paired with the guide vane structure 36. The present disclosure, however, is not limited to such an exemplary propulsion system configuration. For example, it is contemplated the aircraft propulsion system 20 may be configured as a single rotor (SR) open rotor propulsion system without the guide vane structure 36. In another example, it is contemplated the aircraft propulsion system 20 may be configured as a counter-rotating open rotor (CROR) propulsion system where the guide vane structure 36 is replaced by another open propulsor rotor which may also be powered by the low speed rotating structure 90 or otherwise.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   an open propulsor rotor configured to rotate about an axis;
   an open guide vane structure aft of the open propulsor rotor along the axis; and
   a nose cone forward of the open propulsor rotor along the axis, the nose cone including a forward tip end, an aft base end, a stationary section and a rotating section, the aft base end adjacent to the open propulsor rotor, the stationary section projecting axially along the axis from a junction between the stationary section and the rotating section to the forward tip end, the rotating section projecting axially along the axis from the junction between the stationary section and the rotating section to the aft base end, and the rotating section configured to rotate with the open propulsor rotor about the axis.

2. The assembly of claim 1, wherein
   the nose cone has an axial length extending between the forward tip end and the aft base end; and
   an axial distance from the forward tip end to the junction between the stationary section and the rotating section is equal to or greater than fifty percent of the axial length.

3. The assembly of claim 1, wherein
   the nose cone has an axial length extending between the forward tip end and the aft base end; and
   an axial distance from the forward tip end to the junction between the stationary section and the rotating section is equal to or less than eighty percent of the axial length.

4. The assembly of claim 1, wherein a sidewall of the stationary section is flush with a sidewall of the rotating section at the junction between the stationary section and the rotating section.

5. The assembly of claim 1, wherein a sidewall of the rotating section is radially outboard of and axially overlaps a sidewall of the stationary section at the junction between the stationary section and the rotating section.

6. The assembly of claim 1, wherein a sidewall of the stationary section is radially outboard of a sidewall of the rotating section at the junction between the stationary section and the rotating section.

7. The assembly of claim 1, wherein an overlap between a sidewall of the stationary section and a sidewall of the rotating section at the junction between the stationary section and the rotating section is symmetrical about the axis.

8. The assembly of claim 1, wherein an overlap between a sidewall of the stationary section and a sidewall of the rotating section at the junction between the stationary section and the rotating section is asymmetrical about the axis.

9. The assembly of claim 1, wherein the nose cone further includes an air scoop disposed at the junction between the stationary section and the rotating section; and the air scoop is configured to direct air into an internal volume of the nose cone.

10. The assembly of claim 9, wherein the air scoop is formed by the stationary section and the rotating section.

11. The assembly of claim 1, further comprising:

an air passage internal to the aircraft propulsion system;

the stationary section and the rotating section forming an air scoop at the junction between the stationary section and the rotating section, and the air scoop configured to fluidly couple an environment external to the nose cone with the air passage.

12. The assembly of claim 1, wherein the nose cone further includes an air scoop disposed at the junction between the stationary section and the rotating section, and the assembly further comprises:

an air system fluidly coupled to the air scoop;

the air system configured to use air received from the air scoop to cool one or more internal components of the aircraft propulsion system.

13. The assembly of claim 1, wherein the nose cone further includes an air scoop disposed at the junction between the stationary section and the rotating section, and the assembly further comprises:

an air system fluidly coupled to the air scoop;

the air system configured to use air received from the air scoop to vent one or more internal volumes within the aircraft propulsion system.

14. The assembly of claim 1, wherein the open propulsor rotor includes a platform and a plurality of open propulsor blades projecting radially out from the platform; and the rotating section is discrete from the platform.

15. The assembly of claim 1, wherein the rotating section is mechanically fastened to the open propulsor rotor.

16. The assembly of claim 1, further comprising a turbine engine configured to drive rotation of the open propulsor rotor and the rotating section about the axis.

17. An assembly for an aircraft propulsion system, comprising:

an open propulsor rotor configured to rotate about an axis; and a nose cone upstream of the open propulsor rotor, the nose cone including a forward tip end, an aft base end, a stationary section, a rotating section and an air scoop, the aft base end bordering the open propulsor rotor, the stationary section projecting axially along the axis from a junction between the stationary section and the rotating section to the forward tip end, the rotating section projecting axially along the axis from the junction between the stationary section and the rotating section to the aft base end, the rotating section configured to rotate with the open propulsor rotor about the axis, and the air scoop located at the junction between the stationary section and the rotating section.

18. The assembly of claim 17, wherein the nose cone has an axial length extending between the forward tip end and the aft base end; and an axial distance from the forward tip end to the junction between the stationary section and the rotating section is between fifty percent and eighty percent of the axial length.

19. The assembly of claim 17, further comprising an air system configured to receive air from outside of the aircraft propulsion system through the air scoop.

20. An assembly for an aircraft propulsion system, comprising:

an open propulsor rotor configured to rotate about an axis; and a nose cone upstream of the open propulsor rotor, the nose cone including a forward tip end, an aft base end, a stationary section and a rotating section, the aft base end bordering the open propulsor rotor, the stationary section projecting axially along the axis from a junction between the stationary section and the rotating section to the forward tip end, the rotating section projecting axially along the axis from the junction between the stationary section and the rotating section to the aft base end, and the rotating section configured to rotate with the open propulsor rotor about the axis;

wherein a sidewall of the stationary section axially overlaps a sidewall of the rotating section at the junction between the stationary section and the rotating section.

* * * * *